United States Patent
Satake et al.

(10) Patent No.: US 12,481,058 B2
(45) Date of Patent: Nov. 25, 2025

(54) ULTRASONIC SENSOR

(71) Applicant: DENSO CORPORATION, Kariya (JP)

(72) Inventors: Masayoshi Satake, Nisshin (JP); Youhei Suzuki, Nisshin (JP); Kensuke Kobayashi, Nisshin (JP); Dai Kondou, Kariya (JP)

(73) Assignee: DENSO CORPORATION, Kariya (JP)

( * ) Notice: Subject to any disclaimer, the term of this patent is extended or adjusted under 35 U.S.C. 154(b) by 184 days.

(21) Appl. No.: 17/507,686

(22) Filed: Oct. 21, 2021

(65) Prior Publication Data
US 2022/0043147 A1 Feb. 10, 2022

Related U.S. Application Data (63) Continuation of application No. PCT/JP2020/016205, filed on Apr. 10, 2020.

(30) Foreign Application Priority Data

Apr. 23, 2019 (JP) ................... 2019-082277

(51) Int. Cl.
*G01S 15/931* (2020.01)
*G01S 7/521* (2006.01)

(52) U.S. Cl.
CPC ............ *G01S 15/931* (2013.01); *G01S 7/521* (2013.01); *G01S 2015/938* (2013.01)

(58) Field of Classification Search
None
See application file for complete search history.

(56) References Cited

U.S. PATENT DOCUMENTS

| | | | | |
|---|---|---|---|---|
| 4,755,975 A | * | 7/1988 | Ito | H04R 17/00 381/166 |
| 5,121,628 A | * | 6/1992 | Merkl | G01F 23/2968 73/632 |
| 5,962,952 A | * | 10/1999 | Gluszyk | G10K 11/004 310/334 |
| 7,392,705 B2 | * | 7/2008 | Kawashima | G10K 9/18 73/632 |

(Continued)

FOREIGN PATENT DOCUMENTS

| CN | 102873018 A | 1/2013 |
|---|---|---|
| DE | 202007007135 U1 | 9/2007 |

(Continued)

*Primary Examiner* — Isam A Alsomiri
*Assistant Examiner* — Vikas Atmakuri
(74) *Attorney, Agent, or Firm* — Maschoff Brennan (57) ABSTRACT

An ultrasonic sensor comprises: an ultrasonic element that converts between an electric signal and ultrasonic vibration; and an element housing case having a bottomed tubular shape and housing the ultrasonic element therein. The element housing case includes a side plate portion having a tubular shape surrounding a directivity central axis, and a bottom plate portion that closes one end of the side plate portion in an axial direction parallel to the directivity central axis. The ultrasonic element is attached to the bottom plate portion. A part of the bottom plate portion inside an outline of the ultrasonic element when viewed along the directivity central axis includes a space formed due to a part of the part inside the outline being separated from the ultrasonic element.

11 Claims, 6 Drawing Sheets

(56) References Cited

U.S. PATENT DOCUMENTS

| | | | |
|---|---|---|---|
| 7,548,014 B2 * | 6/2009 | Asada | G10K 9/122 310/334 |
| 7,737,609 B2 * | 6/2010 | Murata | G10K 9/22 310/348 |
| 8,264,124 B2 * | 9/2012 | Matsumoto | G01S 7/521 310/326 |
| 8,779,649 B2 * | 7/2014 | Sakai | G10K 9/122 310/326 |
| 9,105,835 B2 * | 8/2015 | Ibata | G10K 9/122 |
| 10,478,858 B2 * | 11/2019 | Lasiter | H10N 30/2047 |
| 10,923,099 B2 * | 2/2021 | Beckers | A61B 8/4281 |
| 2006/0284515 A1 * | 12/2006 | Nakajima | B60R 19/483 310/311 |
| 2007/0237031 A1 * | 10/2007 | Kawashima | G10K 9/22 367/140 |
| 2007/0284682 A1 * | 12/2007 | Laming | H04R 7/18 257/E21.526 |
| 2008/0116765 A1 * | 5/2008 | Sugiura | B06B 1/0629 310/334 |
| 2013/0313084 A1 | 11/2013 | Mellert et al. | |

FOREIGN PATENT DOCUMENTS

| | | |
|---|---|---|
| DE | 102012201884 A1 | 8/2013 |
| EP | 3 705 801 A1 | 9/2020 |
| GB | 2543409 A | 4/2017 |
| JP | 2009-55458 A | 3/2009 |
| JP | 2009055458 A * | 3/2009 |
| JP | 2010-278594 A | 12/2010 |
| JP | 2012-034014 A | 2/2012 |

* cited by examiner

ULTRASONIC SENSOR

CROSS-REFERENCE TO RELATED APPLICATION

The present application is a continuation application of International Application No. PCT/JP2020/016205, filed on Apr. 10, 2020, which claims priority to Japanese Patent Application No. 2019-082277, filed on Apr. 23, 2019. The contents of these applications are incorporated herein by reference in their entirety.

BACKGROUND

Technical Field

The present disclosure relates to an ultrasonic sensor.

Background Art

Ultrasonic sensors that externally transmit ultrasonic waves as search waves and receive the reflected waves resulting from the transmitted ultrasonic waves are used, for example, in object detection devices mounted on vehicles. This type of ultrasonic sensor includes a bottomed tubular case and a piezoelectric element attached to the inner bottom surface of the case. Studies have been conducted to provide a single ultrasonic sensor with a plurality of resonance frequencies for this type of ultrasonic sensor.

SUMMARY

In the present disclosure, provided is an ultrasonic sensor as the following.

The ultrasonic sensor comprises: an ultrasonic element; and an element housing case including a side plate portion and a bottom plate portion, the ultrasonic element is attached to the bottom plate portion, and a part of the bottom plate portion inside an outline of the ultrasonic element when viewed along a directivity central axis includes a space formed due to a part of the part inside the outline being separated from the ultrasonic element.

DETAILED DESCRIPTION OF THE PREFERRED EMBODIMENTS

For example, a single ultrasonic sensor with a plurality of resonance frequencies is disclosed in PTL 1. The ultrasonic sensor described in PTL 1 includes two bottomed tubular cases of different sizes and a piezoelectric element. The open end of the smaller bottomed tubular case is attached to the inner bottom surface of the larger bottomed tubular case so that there is a space formed by the smaller bottomed tubular case. In this ultrasonic sensor, the piezoelectric element is attached to the outer bottom surface of the smaller bottomed tubular case. When ultrasonic waves are transmitted or received, the bottom faces of the large and small bottomed tubular cases bulge in the same direction in some cases and in the opposite directions in other cases, which allows the structure to have a plurality of resonance frequencies.

[PTL 1] JP 2010-278594 A

However, as the large and small bottomed tubular cases of this ultrasonic sensor are bonded to each other, the durability may deteriorate significantly and also the manufacturing cost may increase.

The present disclosure relates to an ultrasonic sensor provided with a plurality of resonance frequencies while securing durability.

According to one aspect of the present disclosure, an ultrasonic sensor comprises: an ultrasonic element that converts between an electric signal and ultrasonic vibration; and an element housing case having a bottomed tubular shape and housing the ultrasonic element therein, and including: a side plate portion having a tubular shape surrounding a directivity central axis, and a bottom plate portion that closes one end of the side plate portion in an axial direction parallel to the directivity central axis, the ultrasonic element is attached to the bottom plate portion, and a part of the bottom plate portion inside an outline of the ultrasonic element when viewed along the directivity central axis includes a space formed due to a part of the part inside the outline being separated from the ultrasonic element.

This configuration allows the ultrasonic sensor to have two vibration propagation paths, namely, a path in which the vibration from the ultrasonic element propagates directly to the bottom plate portion of the element housing case and a path in which the vibration propagates to the bottom plate portion via the space. Thus, a single ultrasonic sensor in which a plurality of vibration modes are generated and which has a plurality of resonance frequencies is provided. The above configuration also eliminates the need to bond another member between the element housing case and the ultrasonic element, which leads to improved durability and reduced manufacturing cost.

The reference signs in parentheses attached to the components or the like indicate examples of the correspondence between the components or the like and the specific components described in relation to the embodiments described below.

Embodiments of the present disclosure will be described below with reference to the drawings. In the following embodiments, parts of an embodiment that are the same or equivalent to parts of another embodiment are assigned with the same reference signs.

Embodiments

An ultrasonic sensor 1 according to an embodiment will be described. The ultrasonic sensor 1 is suitable for use in, for example, an object detection device mounted on a vehicle such as an automobile, but is not limited to this, and can be applied to other uses. In this embodiment, an example in which the sensor is applied to a vehicle-mounted object detection device will be described as a typical example.

Installation Example

Figure 1:
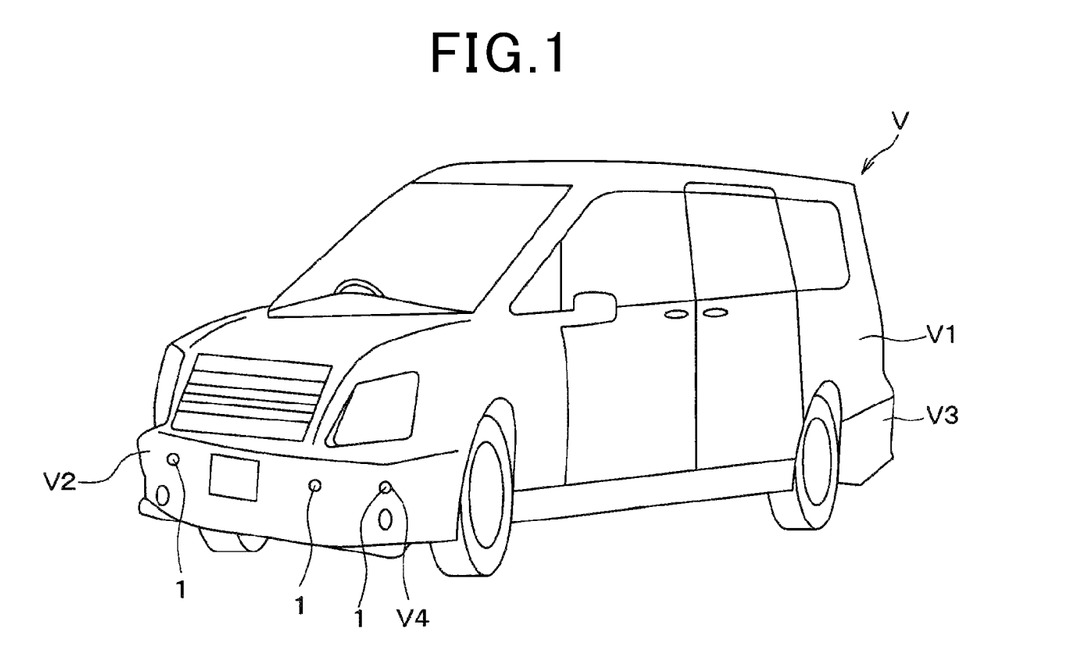
FIG. 1 is a diagram illustrating an installation example of an ultrasonic sensor according to an embodiment.

An example of installation of the ultrasonic sensor 1 to a vehicle will be briefly described with reference to FIG. 1. As shown in FIG. 1, for example, a plurality of ultrasonic sensors 1 are installed on a vehicle V having a box-shaped vehicle body V1. Specifically, the ultrasonic sensors 1 are mounted on a front bumper V2 attached to the front end part of the vehicle body V1 and a rear bumper V3 attached to the rear end part.

The front bumper V2 and the rear bumper V3 are provided with mounting holes V4, which are through holes for mounting the ultrasonic sensors 1. The ultrasonic sensors 1 mounted on the front bumper V2 and the rear bumper V3 are so-called vehicle-mounted clearance sonars.

Configuration

Next, the configuration of the ultrasonic sensors 1 will be described with reference to FIGS. 2 to 4.

Figure 2:
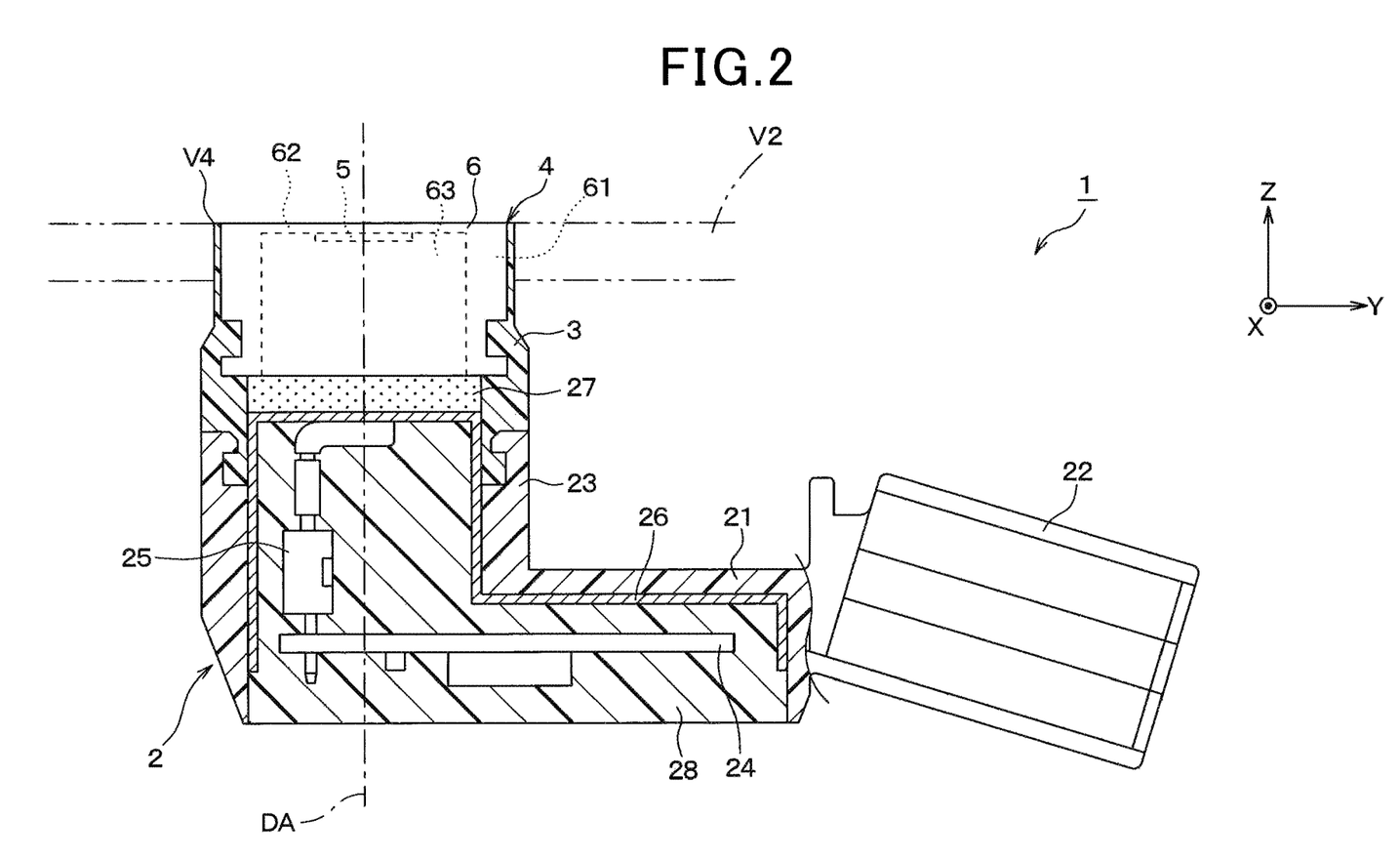
FIG. 2 is a cross-sectional view showing the general device configuration of the ultrasonic sensor.

Hereinafter, for convenience of explanation, an XYZ rectangular coordinate system will be set so that the Z axis is parallel to the directivity center axis DA of the ultrasonic sensors 1 as shown in FIG. 2. The direction parallel to the directivity center axis DA is referred to as "axial direction". The upper side of FIG. 2, that is, the side in the positive direction along the Z axis may be referred to as the "distal end side" in the axial direction. Similarly, the lower side of FIG. 2, that is, the side in the negative direction along the Z axis may be referred to as the "proximal end side" in the axial direction. Further, any direction orthogonal to the axial direction may be referred to as an "in-plane direction". That is, an "in-plane direction" is a direction parallel to the XY plane in FIG. 2. FIG. 3 shows, in addition to an XYZ coordinate system corresponding to the XYZ rectangular coordinate system of FIG. 2, the outline of a recess 621, with a broken line, which is not visible as it is covered with an ultrasonic element 5 described later.

Each ultrasonic sensor 1 includes a sensor case 2, an elastic holding member 3, and an ultrasonic microphone 4. The ultrasonic microphone 4 includes the ultrasonic element 5 and an element housing case 6. Next, the components of the ultrasonic sensor 1 will be described.

As shown in FIG. 2, the sensor case 2 is a housing of the ultrasonic sensor 1 and also it is configured to hold the elastic holding member 3. The sensor case 2 includes a case main body part 21, a connector part 22, and a case tubular part 23. These parts of the sensor case 2 are integrally formed from a hard synthetic resin such as polypropylene.

The case main body part 21 is a box-like part having a substantially rectangular parallelepiped outer shape, and has a bottomed tubular shape with its open end on the proximal end side in the axial direction.

The connector part 22 extends outward from the side wall portion of the case main body part 21 to electrically connect the ultrasonic sensor 1 to an external device such as an electronic control unit.

The case tubular part 23 is a part with a generally cylindrical shape, protruding from the case main body part 21 to the distal end side in the axial direction. The case tubular part 23 is configured to hold the axially-proximal end part of the elastic holding member 3 having a generally cylindrical shape. The center axis of the elastic holding member 3 is the directivity center axis DA. The cylindrical space inside the case tubular part 23 communicates with the substantially rectangular parallelepiped space inside the case main body part 21. Hereinafter, the space inside the case tubular part 23 and the space inside the case main body part 21 are collectively referred to as "the space inside the sensor case 2".

A circuit board 24, a wiring portion 25, and a shield portion 26 are housed in the space inside the sensor case 2. The circuit board 24, which controls the operation of the ultrasonic sensors 1, is housed in the case main body part 21. The wiring portion 25 electrically connects the ultrasonic microphone 4 and the circuit board 24. The shield portion 26 is fixed to the inner surface of the sensor case 2 so as to electromagnetically shield the circuit board 24 and the wiring portion 25 by covering the circuit board 24 and the wiring portion 25.

A damper member 27 is a disk-shaped member and has an outer diameter corresponding to the inner diameter of the elastic holding member 3. That is, the damper member 27 is fitted in the cylindrical space inside the elastic holding member 3 at a position that is closer to the proximal end side than the ultrasonic microphone 4 in the axial direction. The damper member 27 is provided to suppress transmission of vibration from the ultrasonic microphone 4 to the sensor case 2. Specifically, the damper member 27 is formed of, for example, a foamed elastic material such as foamed silicone having insulating and elastic properties.

A filler 28 is filled in the space inside the sensor case 2. The filler 28 is formed of, for example, a synthetic resin material such as silicone rubber having insulating and elastic properties.

The elastic holding member 3 is formed of a synthetic resin-based elastic material such as silicone rubber having insulating and elastic properties. Synthetic resin-based elastic materials are also referred to as "viscoelastic materials" or "elastomers". The elastic holding member 3 is configured to elastically support the ultrasonic microphone 4 by covering the proximal end side of the ultrasonic microphone 4 while exposing its distal end side in the axial direction.

The ultrasonic microphone 4 includes the ultrasonic element 5 and the element housing case 6 and serves as an ultrasonic transmitter/receiver. That is, the ultrasonic microphone 4 is configured to be capable of transmitting and receiving ultrasonic waves.

In other words, the ultrasonic microphone 4 is configured to transmit search waves along the directivity center axis DA based on the applied drive signals. The directivity center axis DA is a virtual half-line extending from the ultrasonic microphone 4 along the transmission/reception direction of ultrasonic waves, and serves as a reference for the directivity angle. The "directivity central axis" may also be referred to as a "detection axis". The ultrasonic microphone 4 is also configured to receive reflected waves from objects existing around it and generate received signals.

The ultrasonic element 5 is configured to convert electric signals and ultrasonic vibration. The ultrasonic element 5 is, for example, a thin-film piezoelectric element and its thickness direction is in the axial direction. As shown in FIG. 3, for example, the ultrasonic element 5 is attached to the inner surface of a bottom plate portion 62, which will be described later, of the element housing case 6 having a bottomed tubular shape. The inner surface of the bottom plate portion 62 is a surface surrounded by a side plate portion 61 which will be described later.

Figure 4:
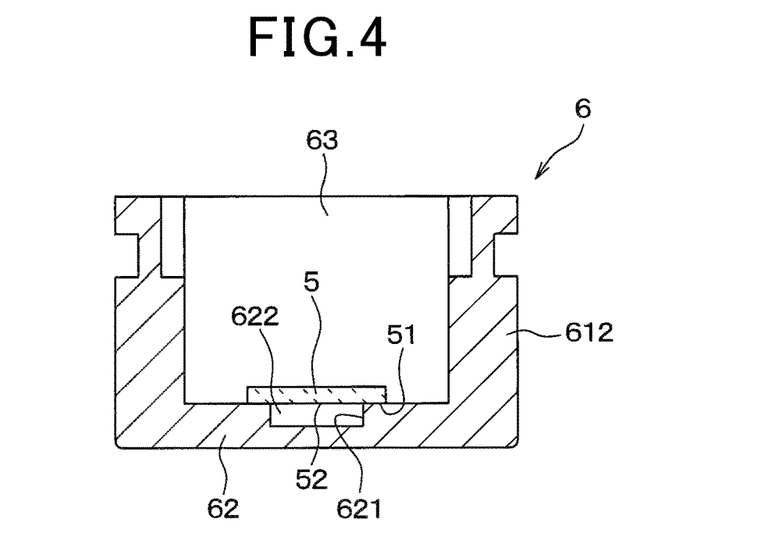
FIG. 4 is a cross-sectional view taken along the line IV-IV in FIG. 3.

Specifically, in the present embodiment, the ultrasonic element 5 is placed so that it covers the recess 621 formed in the bottom plate portion 62, as shown in FIG. 4, for example, and it forms a first space 622 together with the recess 621. The bonded face of the ultrasonic element 5 facing the bottom plate portion 62 includes a contact part 51, which is the part attached to the bottom plate portion 62, and a non-contact part 52, which is the rest of the bonded face of the ultrasonic element 5. It can also be said that the non-contact part 52 is the part that is not bonded to the bottom plate portion 62.

Figure 5:
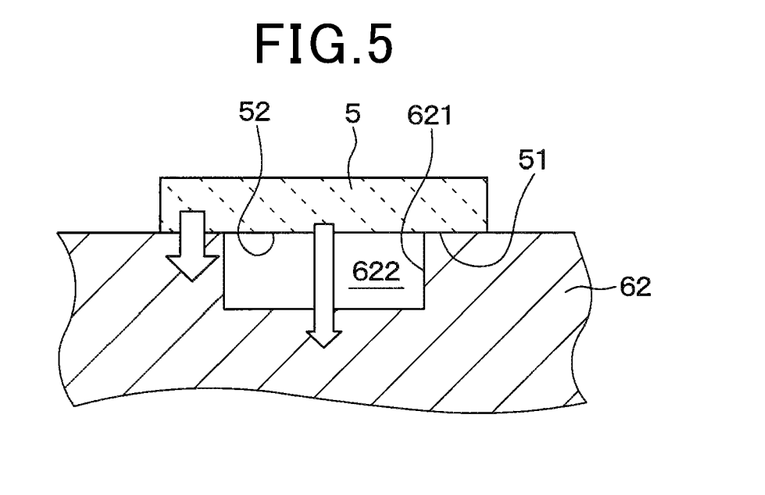
FIG. 5 is a diagram showing vibration transmission paths between the ultrasonic element and the element housing case.

As shown by the white arrows in FIG. 5, for example, the non-contact part 52 is provided to generate two paths having different vibration propagation velocities from the ultrasonic element 5 to the bottom plate portion 62, so that the ultrasonic sensor 1 can have a plurality of resonance frequencies. The two vibration propagation paths include a first propagation path in which the vibration propagates directly from the ultrasonic element 5 to the bottom plate portion 62, and a second propagation path in which the vibration propagates from the ultrasonic element 5 to the bottom plate portion 62 via the first space 622. The effects obtained by having such a configuration will be described later. Note that, in order to enhance these effects, the non-contact part 52 preferably occupies an area that is equal to or greater than that of the contact part 51 in the bonded face, in other words, occupies 50% or more of the bonded face.

The element housing case 6 has a bottomed tubular shape with a central axis coinciding with the directivity central axis DA, and it has a second space 63 inside it capable of housing the ultrasonic element 5. The element housing case 6 includes a side plate portion 61 and a bottom plate portion 62, which are made of the same material. The element housing case 6 is seamlessly and integrally formed of a metal such as aluminum.

The side plate portion 61 has, for example, a tubular shape surrounding the directivity central axis DA, that is, a cylindrical shape with a central axis substantially parallel to the directivity central axis DA. The side plate portion 61 includes a thin-walled part 611 and a thick-walled part 612.

The thin-walled part 611 has a partially-cylindrical shape with a certain thickness in the radial direction orthogonal to the directivity central axis DA. The "radial direction" is a direction extending radially from the directivity central axis DA. That is, the radial direction is the direction of the radius of a virtual circle drawn on a plane to which the directivity central axis DA is a normal so that the center of the circle is at the intersection of the plane and the directivity central axis DA. Further, the radial dimension of each of the components of the side plate portion 61 may be referred to as "thickness". In other words, the thin-walled part 611 has a constant thickness that is smaller than that of thick-walled part 612.

For example, the thickness of the thin-walled portion 611 has a dimension closest to, of the radial dimension of the side plate portion 61 and axial dimension of the bottom plate portion 62, the axial thickness of the bottom plate portion 62. Specifically, the thin-walled part 611 has a thickness that is 0.3 to 2.0 times, preferably 0.5 to 1.5 times, more preferably 0.7 to 1.2 times the thickness (i.e., the axial dimension) of the bottom plate portion 62. Typically, the thin-walled part 611 can have substantially the same thickness as the bottom plate portion 62.

The thick-walled part 612 has a thickness (i.e., a radial dimension) that is greater than that of thin-walled part 611. Specifically, in the present embodiment, the thick-walled part 612 has a bow-like shape defined by a chord and an arc and extending in the x-axis direction when viewed in a direction parallel to the directivity central axis DA. The thick-walled part 612 abuts the thin-walled part 611 in the circumferential direction surrounding the directivity central axis DA. The "circumferential direction" is the circumferential direction of the above-mentioned virtual circle.

In the present embodiment, a pair of thin-walled parts 611 face each other with the directivity center axis DA interposed between them. Similarly, a pair of thick-walled parts 612 face each other with the directivity center axis DA interposed between them. That is, in the present embodiment, when viewed in a direction parallel to the directivity central axis DA, the second space 63 has a rounded rectangular shape or an oval shape composed of a pair of semicircles and a pair of line segments. The side plate portion 61 includes a pair of thin-walled parts 611 corresponding to the semicircles and a pair of thick-walled parts 612 corresponding to the line segments. Because of this configuration, the directivity angle of the ultrasonic microphone 4 in the Y-axis direction is smaller than that in the X-axis direction. Since the thick-walled part 612 may be designed as a part for adjusting the directivity of ultrasonic waves, it may also be referred to as a "directivity adjusting part".

The bottom plate portion 62 is a flat plate or a thin plate having a thickness direction in the axial direction, and it is provided so as to close one end of the side plate portion 61 in the axial direction. Specifically, the bottom plate portion 62 is seamlessly and integrally connected to the axially-distal end of the side plate portion 61. As shown in FIG. 3, after being attached to the bottom plate portion 62, when the ultrasonic element 5 transmits or receives ultrasonic waves, the bottom plate portion 62 vibrates ultrasonically in the axial direction, while bending with its outer edge connected to the side plate portion 61 serving as a fixed end. The recess 621 is provided on the inner face of the bottom plate portion 62, that is, the face facing the second space 63 in which the ultrasonic element 5 is housed.

The recess 621 is, for example, a syringe-shaped groove, and is formed by any appropriate process such as a cutting process. In the present embodiment, the recess 621 is entirely covered with the ultrasonic element 5. That is, as shown in FIG. 3, the part of the bottom plate portion 62 inside the outline of the ultrasonic element 5 when viewed from the directivity central axis DA, that is, the part inside the outline forms the first space 622 since a part of it is separated from the ultrasonic element 5. In the present embodiment, the part of the bottom plate portion 62 inside the outline is provided with the recess 621 so that the first space 622 is formed between the bottom plate portion 62 and the ultrasonic element 5.

The first space 622 formed by the recess 621 and the ultrasonic element 5 is filled with a medium having a vibration propagation velocity different from that of the material of the bottom plate portion 62, such as air or silicone. In other words, the first space 622 is filled with a substance different from the material of the bottom plate portion 62.

The above is the basic configuration of the ultrasonic sensor 1 of the present embodiment.

Effects

Next, the effects provided by the ultrasonic sensors 1 of the present embodiment will be described with reference to FIGS. 5 to 6.

In an ultrasonic sensor 1 having the above configuration, the ultrasonic element 5 vibrates ultrasonically when an electric signal is input from a wiring (not shown). When the ultrasonic element 5 vibrates ultrasonically, the vibration excites the element housing case 6 and causes it to vibrate. As a result, the ultrasonic microphone 4 including the ultrasonic element 5 and the element housing case 6 vibrates in a certain vibration mode.

In the above configuration, the bottom plate portion 62 is provided with the recess 621, and the ultrasonic element 5 is attached so as to cover the recess 621. In other words, the first space 622 formed by the recess 621 is filled with a medium having a propagation velocity of vibration from the ultrasonic element 5 different from that of the material of the bottom plate portion 62.

Because of this, as shown in FIG. 5, the ultrasonic microphone 4 has a first vibration mode which is caused by the vibration from the ultrasonic element 5 propagating directly to the bottom plate portion 62. In addition to the first vibration mode, the ultrasonic microphone 4 has a second vibration mode which is caused by the vibration from the ultrasonic element 5 propagating to the bottom plate portion 62 via the first space 622. Accordingly, in addition to a first structural resonance frequency generated from the first vibration mode, a second structural resonance frequency is generated from the second vibration mode. The first structural resonance frequency and the second structural resonance frequency have such a relationship that neither is not a higher-order resonance frequency of the other.

Figure 3:
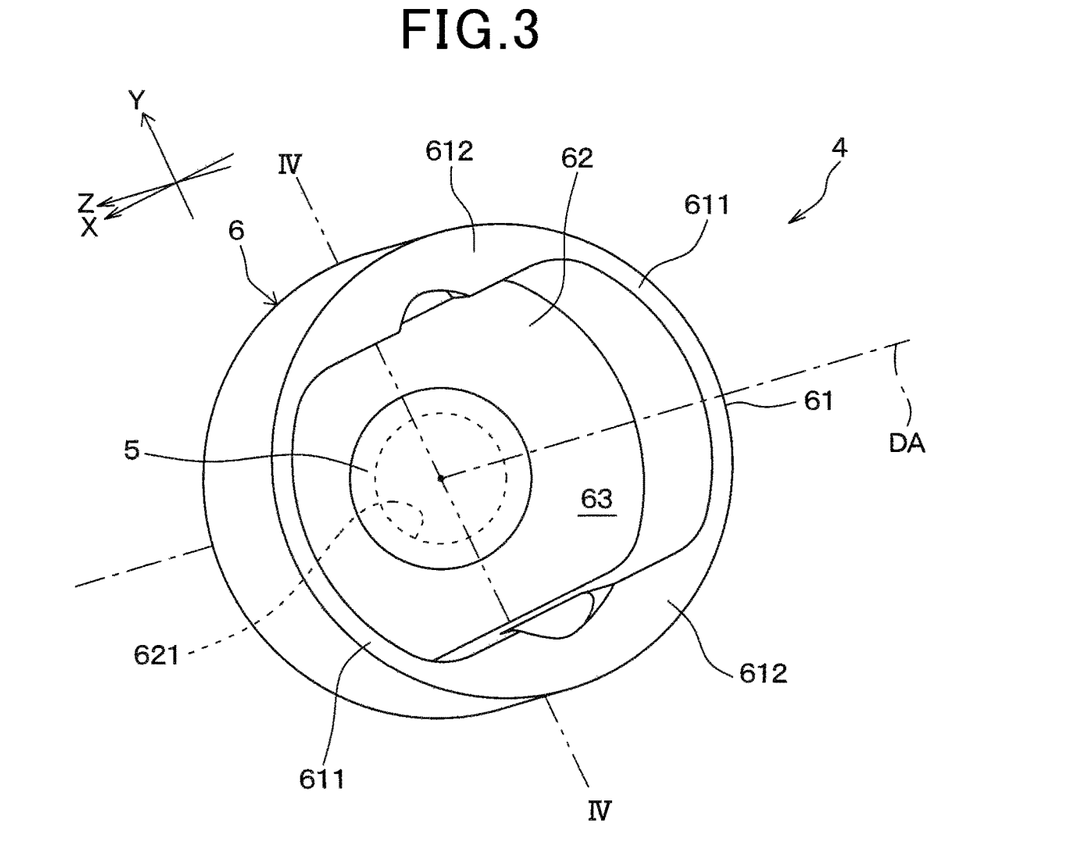
FIG. 3 is a perspective view showing the general configuration of the ultrasonic microphone shown in FIG. 2.
Figure 6:
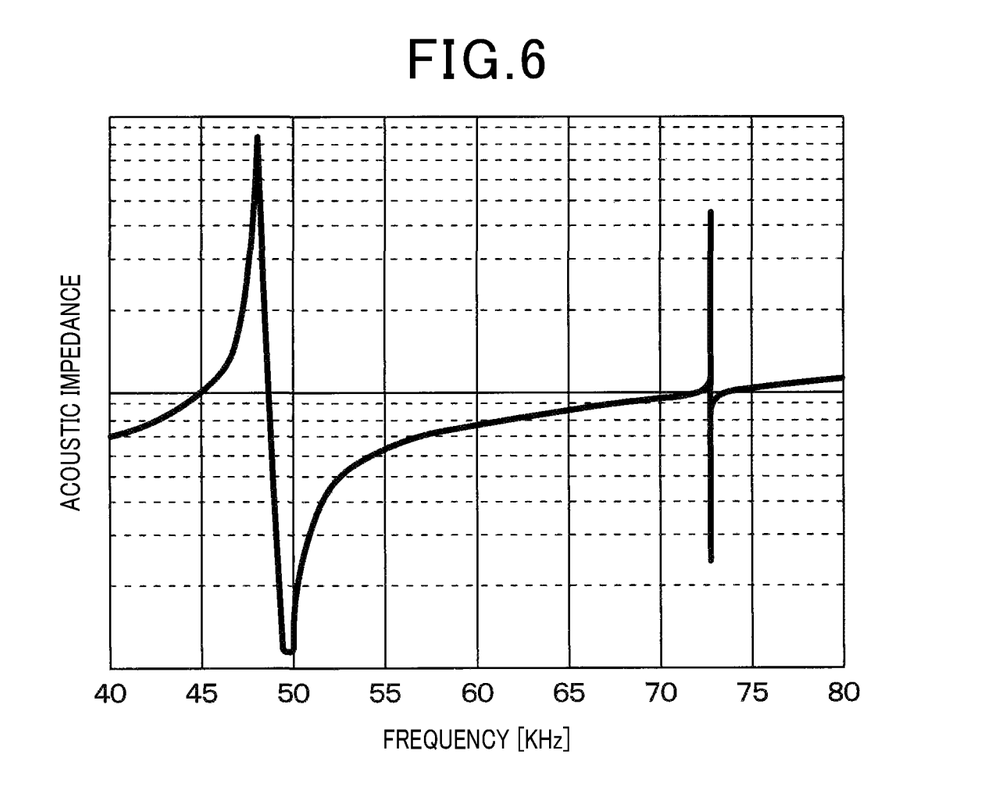
FIG. 6 is a graph showing the acoustic impedance characteristics of the ultrasonic microphone shown in FIG. 3.

A computer simulation of the above-described vibration state was carried out to acquire the acoustic impedance characteristics of the ultrasonic microphone 4 shown in FIG. 3, and the result is shown in FIG. 6. In the ultrasonic microphone 4, two significant structural resonance frequencies are generated in the range of 40 to 80 kHz. One of the structural resonance frequencies generated at about 48 kHz corresponds to the first vibration mode described above. The other structural resonance frequency generated at about 73 kHz is caused by the generation of the second vibration mode described above. Specifically, the other structural resonance frequency is considered to be a combination of the vibration waves of the first vibration mode and the vibration of the second vibration mode.

As described above, the recess 621 has a size and shape that significantly generate a first structure resonance frequency and a second structure resonance frequency which do not have a relationship that either is a higher-order resonance frequency of the other. For example, the outer shape of the recess 621 is not limited to a substantially cylindrical shape, and instead it may be substantially a prism, an elliptic cylinder, or any another appropriate shape.

According to this embodiment, one ultrasonic microphone 4 can be provided with a plurality of structural resonance frequencies by a simple change in shape, that is, by providing the recess 621 on the inner face of the bottom plate portion 62. Further, as compared with the conventional structure in which two bottomed tubular cases of different sizes are bonded together, it is possible to suppress a decrease in durability as well as an increase in cost. Thus, a single ultrasonic sensor 1 having a plurality of resonance frequencies while securing durability is provided.

First Modification

Figure 7:
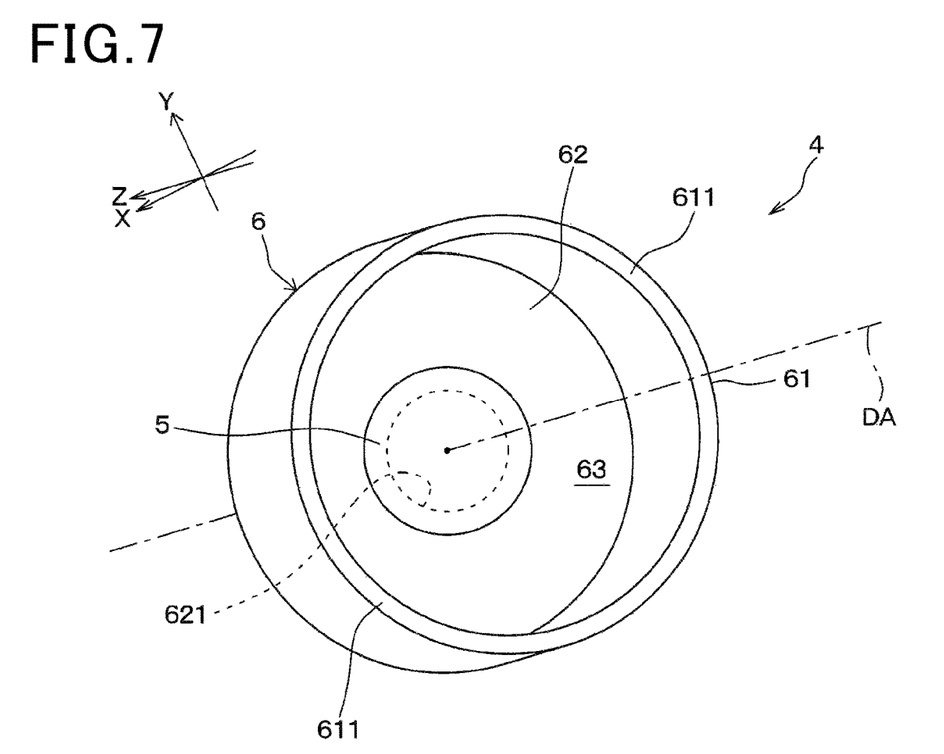
FIG. 7 is a perspective view showing the general configuration of an element housing case according to the first modification.

In the ultrasonic sensor 1, as shown in FIG. 7, the element housing case 6 may have a side plate portion 61 composed of only the thin-walled part 611. Such a structure can also produce the effect of having a plurality of resonance frequencies if the recess 621 is formed in the bottom plate portion 62 and the ultrasonic element 5 is placed thereon.

Second Modification

Figure 8:
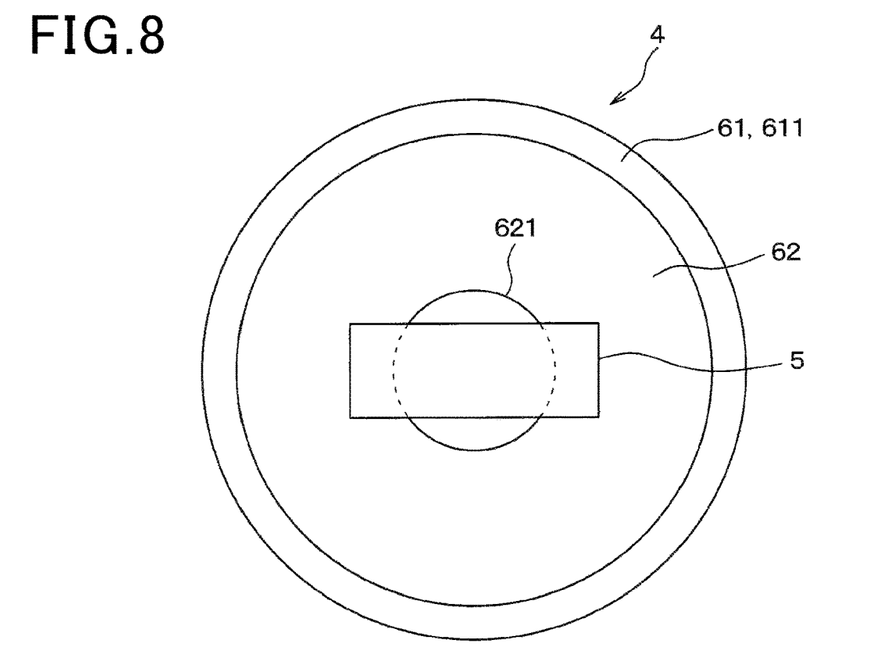
FIG. 8 is a plan view showing the general configuration of an ultrasonic microphone according to the second modification.

In the ultrasonic sensor 1, as shown in FIG. 8, the ultrasonic microphone 4 may have a structure in which the ultrasonic element 5 covers only a part of the recess 621, that is, a structure in which the first space 622 and the second space 63 communicate with each other. Even with such a structure, the ultrasonic sensor 1 can have a plurality of resonance frequencies as in the above embodiment. Note that FIG. 8 shows a plan view of the ultrasonic microphone 4 as viewed from the directivity central axis, and the broken line represents the part of the outline of the recess 621 that is invisible due to the ultrasonic element 5.

Third Modification

Figure 9:
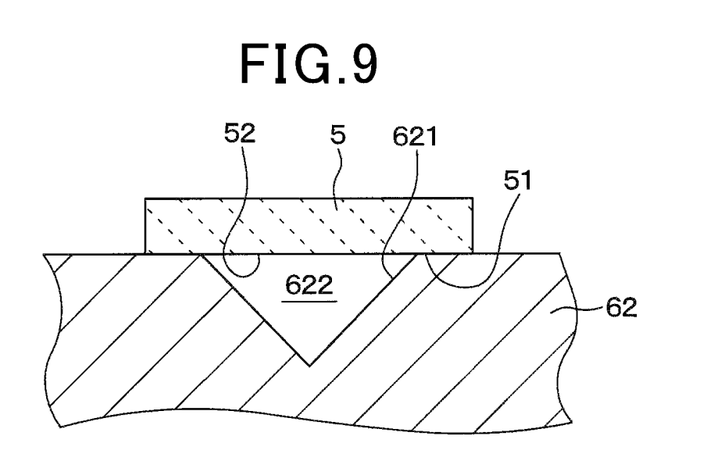
FIG. 9 is a cross-sectional view showing the recess provided in a bottom plate portion according to the third modification.

In the ultrasonic sensor 1, as shown in FIG. 9, the recess 621 may be a groove with a wedge-like cross section. In this case, the outer shape of the recess 621 is, for example, a conical or polygonal pyramid when viewed in a cross-sectional view. That is, the recess 621 may have any shape that provides the ultrasonic microphone 4 with the first space 622 serving as a second propagation path of vibration from the ultrasonic element 5, and the shape is not limited to that of the above embodiment and may be changed as appropriate.

When the distance between the bottom plate portion 62 and the ultrasonic element 5 in the thickness direction of the bottom plate portion 62 serves as "the depth", an example in which the depth of the first space 622 is constant has been described in the above embodiment. On the other hand, in this modified example, the depth of the first space 622 varies depending on the position due to the above-described shape of the recess 621, which may allow the ultrasonic sensor to have three or more resonance frequencies. In this case, other than the wedge-like cross section, the recess 621 may have a shape having a plurality of sections with different depths, such as a stepped shape, and the shape can be determined as appropriate. In addition, when the recess 621 has a shape whose depth is not uniform, the effect of expanding the resonance band can also be obtained.

Fourth Modification

Figure 10:
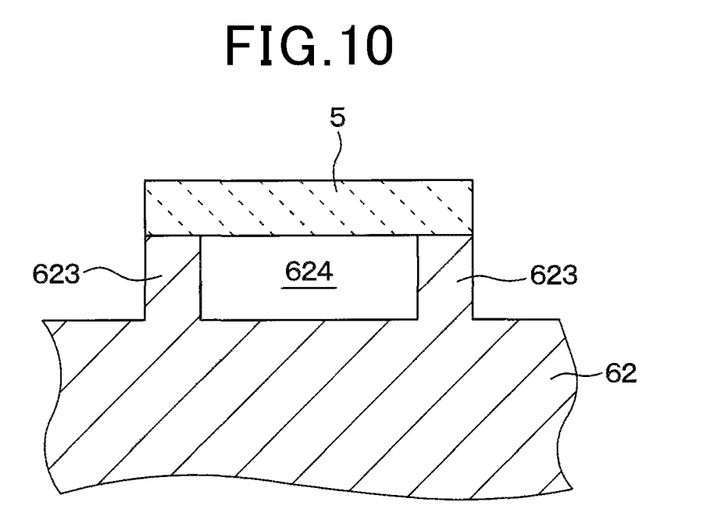
FIG. 10 is a cross-sectional view showing the cross-sectional shape of a bottom plate portion according to the fourth modification.

In the ultrasonic sensor 1, as shown in FIG. 10, the bottom plate portion 62 may include a protrusion 623 having a frame-body shape or partially-frame-body shape on the inner face thereof instead of the recess 621. In this case, the ultrasonic element 5 is attached to the distal end surface of the protrusion 623, and forms a third space 624 together with the region inside the protrusion 623 having a substantially frame-body shape shape. In other words, the part of the bottom plate portion 62 inside the outline is provided with the substantially frame-body shape protrusion 623. The ultrasonic element 5 is attached to the distal end surface of the protrusion 623 so that the third space 624 is formed between the protrusion 623 and the ultrasonic element 5.

This allows the ultrasonic microphone 4 to have a vibration mode which is caused by the vibration from the ultrasonic element 5 propagating to the bottom plate portion 62 via the protrusion 623, and an additional vibration mode which is caused by the vibration from the ultrasonic element 5 propagating to the bottom plate portion 62 via the third space 624. Therefore, this structure also provides an ultrasonic sensor 1 having a plurality of resonance frequencies.

Note that, as with the recess 621, the protrusion 623 has such a size and shape that generate first and second structure resonance frequencies distinctively which do not have a relationship that either is a higher-order resonance frequency of the other. Further, the third space 624 may either be a closed space that is not connected to the second space 63 due to the ultrasonic element 5 or a space that communicates with the second space 63, as in the second modification described above.

Other Embodiments

Although the present disclosure is described based on examples, it should be understood that the present disclosure is not limited to the examples and structures. The present disclosure encompasses various modifications and variations within the scope of equivalence. In addition, the scope of the present disclosure and the spirit thereof include other combinations and embodiments, not only various combinations and embodiments but also those including only one of the components or additional or less components.

(1) For example, the ultrasonic sensor 1 is not limited to a configuration capable of transmitting and receiving ultrasonic waves, and may have a configuration capable of only transmitting ultrasonic waves. Alternatively, the ultrasonic sensor 1 may be configured to have only a function for receiving the reflected waves of search waves, i.e. ultrasonic waves transmitted from an ultrasonic transmitter and reflected by objects around them. That is, the ultrasonic microphone 4 may be for transmission and reception, for transmission, or for reception.

(2) The outer shape of the ultrasonic microphone 4, that is, the element housing case 6 is not limited to a substantially cylindrical shape, and instead it may be a substantially regular hexagonal prism, a substantially regular octagonal prism, or the like.

(3) The ultrasonic element 5 is not limited to a piezoelectric element, and for example, a so-called capacitive element may be used.

(4) Components that are seamlessly and integrally formed with each other in the above description may be formed by connecting separate members together. Similarly, separate components that are connected together may be seamlessly and integrally formed with each other.

(5) Components that are formed of the same material in the above description may be formed of materials that are different from each other. Similarly, components formed of different materials may be formed of the same material.

(6) The above-described embodiment and its modifications may be combined with each other. For example, the bottom plate portion 62 may have a shape in which the protrusion 623 is provided and the recess 621 is formed inside the bottom plate portion 62.

What is claimed is:

1. An ultrasonic sensor comprising:
an ultrasonic element that converts between an electric signal and ultrasonic vibration; and
an element housing case having a bottomed tubular shape and configure to house the ultrasonic element therein, the element housing case comprising:
a side plate portion having a tubular shape surrounding a directivity central axis, and
a bottom plate portion that closes one end of the side plate portion in an axial direction parallel to the directivity central axis,
the ultrasonic element is attached to the bottom plate portion, and
a part of the bottom plate portion inside an outline of the ultrasonic element when viewed along the directivity central axis includes a first space formed due to a part of the part inside the outline being separated from the ultrasonic element, wherein
a face of the ultrasonic element facing the bottom plate portion includes:
a non-contact part that is a part facing the first space; and
a contact part that is a remaining part of the face, and
an area of the non-contact part is equal to or larger than an area of the contact part, wherein
ultrasonic vibrations from the ultrasonic element propagate along a first propagation path or a second propagation path,
the first propagation path comprising a path in which vibration propagates from the ultrasonic element directly to the bottom plate portion of the element housing case,
the second propagation path comprising a path in which vibration propagates from the ultrasonic element to the bottom plate portion via the first space,
the first propagation path comprising a first vibration mode with a first resonance frequency, and
the second propagation path comprising and a second vibration mode with a second resonance frequency.

2. The ultrasonic sensor according to claim 1, wherein the side plate portion includes:
a thin-walled part that has a cylindrical shape or a partially-cylindrical shape with a predetermined thickness in a radial direction orthogonal to the directivity central axis; and
a thick-walled part that is provided at a part of the thin-walled part in a circumferential direction surrounding the directivity central axis and has a radial dimension which is larger than the predetermined thickness.

3. The ultrasonic sensor according to claim 1, wherein the ultrasonic element entirely covers the first space.

4. The ultrasonic sensor according to claim 1, wherein the first space is filled with a substance that is different from a material of the bottom plate portion.

5. The ultrasonic sensor according to claim 1, wherein the bottom plate portion includes a recess, and
the first space is formed by the ultrasonic element and the recess.

6. The ultrasonic sensor according to claim 1, wherein the bottom plate portion includes a protrusion having a frame-body shape or partially-frame-body shape,
the ultrasonic element is attached to a distal end surface of the protrusion,
the first space is formed by the ultrasonic element and a region inside the protrusion, and
the protrusion protrudes more than other parts of the bottom plate portion do.

7. The ultrasonic sensor according to claim 1, wherein, in response to a distance between the ultrasonic element and the bottom plate portion in a thickness direction of the bottom plate portion serving as a depth,
the depth of the first space is constant.

8. The ultrasonic sensor according to claim 1, wherein,
in response to a distance between the ultrasonic element and the bottom plate portion in a thickness direction of the bottom plate portion serving as a depth,
the depth of the first space varies depending on position.

9. The ultrasonic sensor according to claim 1, wherein the ultrasonic element partially covers the first space, and
the first space communicates with a second space of the element housing case.

10. An ultrasonic sensor comprising:
an ultrasonic element that converts between an electric signal and ultrasonic vibration; and
an element housing case having a bottomed tubular shape with an open end and a closed end, the element housing case configured to house the ultrasonic element therein, the element housing case comprising
   a side plate portion having a tubular shape surrounding a directivity central axis, and
   a bottom plate portion that closes the closed end of the element housing case in an axial direction parallel to the directivity central axis,
the ultrasonic element is attached to the bottom plate portion, and
a part of the bottom plate portion inside an outline of the ultrasonic element when viewed along the directivity central axis includes a first space formed due to a part of the part inside the outline being separated from the ultrasonic element,
wherein the ultrasonic element comprises a first face and a second face, the first face is opposite the second face relative to the directivity central axis, the first face faces the closed end of the element housing case and the second face faces the open end of element housing case,
the first face of the ultrasonic element faces the bottom plate portion and the first space, the first face includes:
a non-contact part that is a part facing the first space; and
a contact part that is a remaining part of the face and contacts the bottom plate portion, and
wherein an area of the non-contact part is equal to or larger than an area of the contact part, wherein
ultrasonic vibrations from the ultrasonic element propagate along a first propagation path or a second propagation path,
the first propagation path comprising a path in which vibration propagates from the ultrasonic element directly to the bottom plate portion of the element housing case,
the second propagation path comprising a path in which vibration propagates from the ultrasonic element to the bottom plate portion via the first space,
the first propagation path comprising a first vibration mode with a first resonance frequency, and
the second propagation path comprising and a second vibration mode with a second resonance frequency.

11. The ultrasonic sensor according to claim 10, wherein the side plate portion and the bottom plate portion define a second space within the element housing case that extends along the directivity central axis,
the second face of the ultrasonic element faces the second space, and
the first space is separated from the second space by the ultrasonic element.

* * * * *